THIN FILM ANALOG-TO-DIGITAL ENCODER

Filed Nov. 21, 1961 3 Sheets-Sheet 1

INVENTOR
W. A. BARRETT, JR.
BY Lucian C. Canepa
ATTORNEY

INVENTOR
W. A. BARRETT, JR.
BY Lucian C. Canepa
ATTORNEY

June 22, 1965 W. A. BARRETT, JR 3,191,168

THIN FILM ANALOG-TO-DIGITAL ENCODER

Filed Nov. 21, 1961 3 Sheets-Sheet 3

INVENTOR
W. A. BARRETT, JR.
BY Lucian C. Canepa
ATTORNEY 3,191,168

THIN FILM ANALOG-TO-DIGITAL ENCODER

William A. Barrett, Jr., Chatham, N.J., assignor to Bell Telephone Laboratories, Incorporated, New York, N.Y., a corporation of New York Filed Nov. 21, 1961, Ser. No. 153,921
15 Claims. (Cl. 340—347)

This invention relates to data conversion circuitry and, more particularly, to a magnetic analog-to-digital encoder.

Electrical circuits capable of converting and encoding a continuous or analog input signal into a quantized or digital output are well known. One type of such a converter-encoder employs a plurality of switching elements wherein each is set to respond to a particular amplitude range or threshold of the analog signal. Complex electrical waveforms of amplitudes greater than this threshold will cause selected ones of the nonlinear devices to switch states, while signals below the critical level produce no appreciable changes therein. Typically, sensing devices responsive to the condition of individual switching elements are interrogated at sequential intervals and the information so obtained is used as inputs for further encoding logic stages. The resulting output from these logic stages is representative of the instantaneous magnitude of the analog signal at the time the sensing devices were last interrogated.

The resulting digital information may then be handled with the greater speed and facility which characterize digital information processing systems over the equivalent analog systems.

Various prior art embodiments of encoders employ magnetic cores, transistors and cathode ray tubes, among others, as the nonlinear elements and, typically, diode-transistor arrangements for the encoding logic circuitry.

A related series of encoding embodiments is disclosed in my copending application Serial No. 153,922, filed November 21, 1961, wherein a plurality of magnetic elements are magnetically biased to different points on their hysteresis curves. The elements are further inductively coupled to each of an analog signal, reset pulses and an output sensing device, the analog signal being of an opposite polarity, and the reset pulses being of a like polarity, as the magnetic bias. Selected ones of the output sensing devices are connected into output circuits in alternating polarities.

Upon the application of an analog signal to such an embodiment, the magnetic switching elements whose biases are overcome switch their flux orientations, while the others produce only small, negligible shuttle flux changes. The next regularly recurring reset pulse resets those magnetic elements which were switched, thereby inducing voltages in the output sensing devices associated therewith. Output circuits with an odd number of activated sense devices produce an output, while those with an even number do not. These signals may be further supplied to integrating networks, the outputs of which are essentially rectangular pulses representative of the instantaneous magnitude of the analog signal at the time it was last interrogated by the reset pulses.

When a plurality of thin film deposits are used as the magnetic elements in the above-described mode of operation, the very rapid recycling time, in the order of nanoseconds, inherently obtainable with thin films is not realized. This reduction in switching speed is believed to be attributable to the 180° rotations the domains undergo for every flux reversal, although a suitable theory to explain this phenomenon has not as yet been developed.

An object of this invention is the improvement of data conversion circuits. More specifically, an object is to provide a new and improved analog-to-digital encoder.

Another object of this invention is to provide a unitary circuit arrangement which functions to both convert and encode an analog signal into digital form.

Another object of the present invention is to provide an encoder which is both accurate and reliable.

A further object of this invention is to provide a thin film analog-to-digital encoder which is simply constructed, flexible in application and capable of an extremely rapid conversion rate.

The foregoing and other objects of this invention are realized in one illustrative embodiment thereof which comprises a plurality of thin film elements employed as switching units. The preparation and characteristics of thin films have been widely reported in the literature. See, for example, "Making Reproducible Magnetic-Film Memories" by E. M. Bradley, Electronics Magazine, September 9, 1960. Each of the film elements is inductively coupled along its easy axis of magnetization to an analog signal input winding, a bias winding, and an output winding, and to a readout pulse winding along its hard magnetization axis. The individual signal input and bias windings are each serially connected in input and bias circuits, respectively. The input signal windings all contain a like number of turns, as do each of the output windings. Selective combinations of the equal-turn output windings are serially connected in alternating polarities to form a plurality of output circuits. The combinations employed are dependent upon the specific logic encoding desired.

Each biasing winding included in the bias circuit contains a different number of turns. A continuous constant biasing current is applied to the bias circuit which generates a plurality of magnetic fields which are coupled to the thin film elements along their easy magnetization axes, each of the film elements being coupled to a field of the same polarity but of a different magnetizing force.

A complex analog input current waveform is applied to the input circuit and thereby to the signal input windings of the film elements in a sense opposite to the bias thereon. A periodically recurring readout pulse is applied to the readout circuit, and hence to the equal-turn readout windings, along the hard axes of magnetization of the thin films. This pulse is sufficient to tip or rotate the flux vector from its former orientation along the easy axis to a new orientation along the hard magnetization axis. When this reset pulse current is removed, the magnetization vector, representative of the state of magnetization in the thin film elements, will rotate back to the easy axis of magnetization of each thin film element. The direction along the easy axis to which it will rotate is dependent upon the direction of the net difference between the bias and analog magnetic fields. Thus, since each element has a varying amount of bias flux along its easy axis, film elements with an analog flux drive less than the bias thereon will rotate back to the easy magnetization axis in the same direction as the applied bias, while those film elements wherein the analog drive is greater than the bias field will rotate to the easy axis in a direction opposite to the bias, i.e., in the direction of the analog flux.

This rotation from the hard axis to a new orientation along the easy axis thereby induces an output voltage of one of two possible polarities in each of the output windings. The polarity of the induced voltage will depend on the direction of the difference between the bias field and the analog field. Each output winding is shunted by a diode to eliminate signals induced by film elements wherein the bias field exceeds the analog field. The signals appearing at the terminals of the output circuits are representative of the instantaneous magnitude of the input signal at the time of the last interrogation by the reset source. These output signals may be further processed by an integrating network or a zero-order hold circuit, both well known in the art, to produce a substantially rectangular output voltage. The above-described tipping mode of operation is inherently extremely rapid, and thus the encoder is capable of very high repetition rates.

It is thus one feature of the present invention that a magnetic analog-to-digital encoder include a plurality of thin film elements which are inductively coupled along their easy axes of magnetization to a magnetomotive biasing winding, an analog current input signal winding and an output winding, and along their hard axes of magnetization to a reset pulse winding, and that a plurality of output circuits be formed by serially connecting combinations of the output windings.

It is another feature of this invention that a magnetic analog-to-digital encoder include a plurality of thin film elements each of whose flux vector is tipped between the easy axis of magnetization and the hard axis of magnetization.

A further feature of the present invention is that a magnetic analog-to-digital encoder include a plurality of thin film elements inductively coupled to orthogonal flux drives.

A complete understanding of the present invention and of the above and other features and advantages thereof may be gained from a consideration of the following detailed description of two illustrative embodiments thereof presented hereinbelow in conjunction with the accompanying drawing, in which.

Figure 1:
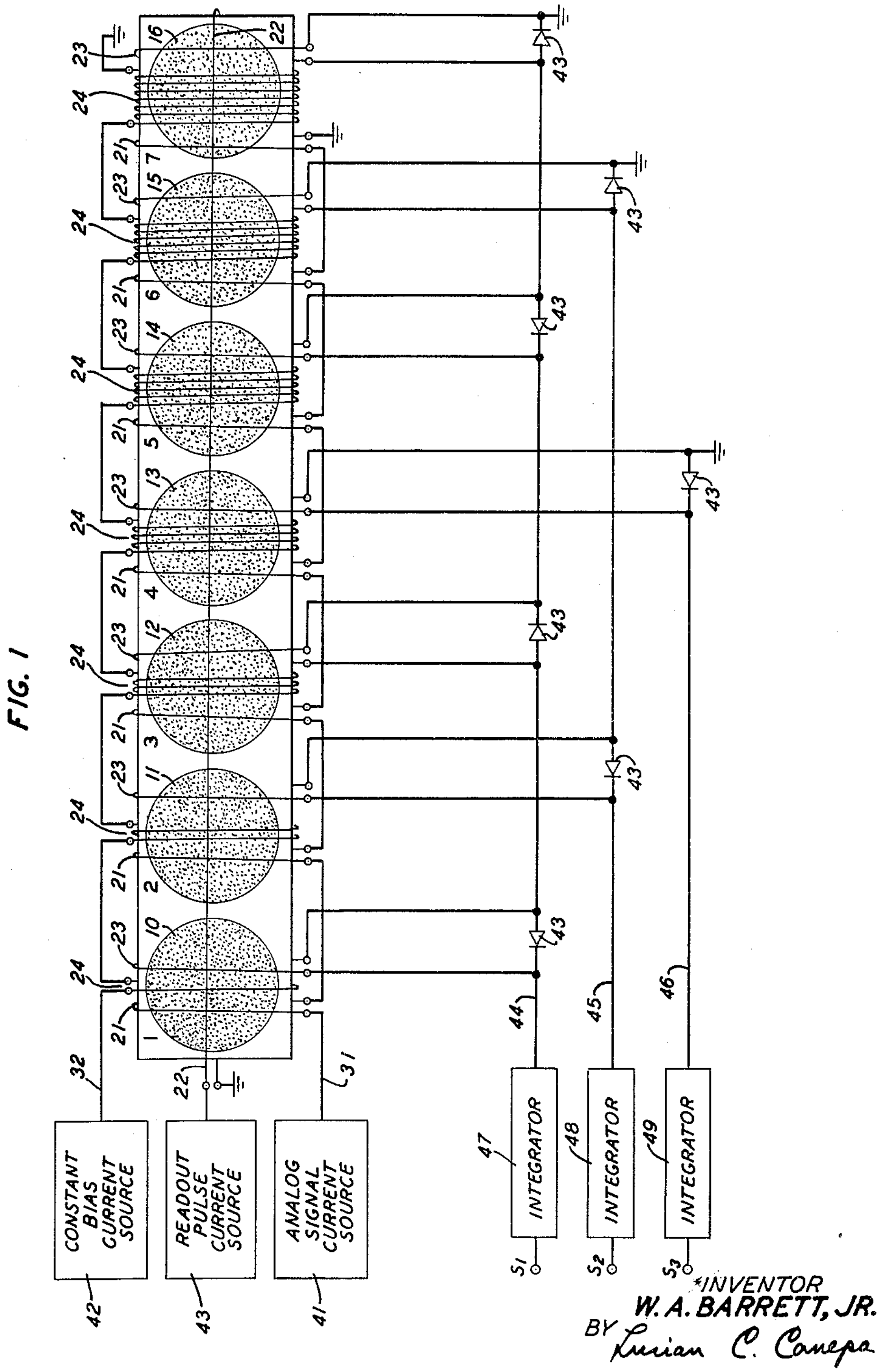
FIG. 1 is a schematic diagram of a first specific illustrative thin film analog-to-digital encoding circuit made in accordance with the principles of the present invention.

Referring now to FIG. 1, there is shown a specific illustrative thin film analog-to-digital encoder made in accordance with the principles of the present invention. The embodiment comprises a plurality of thin film switching elements 10–16 which are depicted as being of a circular geometry deposited on a thin flat rectangular substrate of any common composition. Each of the elements 10–16 has inductively coupled thereto a signal current winding 21, a readout pulse current winding 22, an output winding 23 and a bias winding 24. The input windings 21 on the thin film elements 10–16 are serially connected together in a signal current circuit 31 and the bias windings 24 are serially connected together in a bias circuit 32. The readout winding 22 is common to all the film elements 10–16. Each of the circuits 31 and 32 and the readout winding 22 is connected at one end to ground and at the other end to a specific current source. The input signal circuit 31 is connected at its other end to an analog signal current source 41 which provides a complex analog waveform which is to be converted to a coded form. The bias circuit 32 is connected at its other end to a constant bias current source 42 which provides a continuous biasing current of a constant magnitude and of a polarity to be discussed hereinafter. The readout winding 22 is connected to a readout pulse current source 43 which provides recurrent current pulses of a polarity also discussed hereinafter. Current sources of the character contemplated as comprising the sources 41, 42 and 43 are well known to one skilled in the art. Accordingly, these sources need not be described in detail.

The output windings 23 are each shunted by a diode 43 and are serially connected in selected combinations and in alternating polarities to form output circuits 44, 45 and 46, all of which are grounded at one end and terminate at the other end in integrators 47, 48 and 49, respectively, from which the outputs $S_1$, $S_2$ and $S_3$ are derived. The integrators employed may be of any conventional type well known to one skilled in the art.

Each of the biasing windings 24 has a different number of turns. The constant biasing current supplied by the source 42 and flowing through these biasing windings 24 generates a plurality of bias fields which are coupled to the film elements 10–16 along their easy axes of magnetization. The bias fields coupled to the elements 10–16 are of magnitudes $H_{10}$–$H_{16}$, respectively, as shown on the easy axis hysteresis curve illustrated in FIG. 2.

Also note that in every case the equal-turn signal current windings 21 are of the opposite sense as the biasing windings 24. The readout pulse current winding 22, however, is orthogonal to the bias and signal windings 24 and 21, and is inductively coupled to the thin film elements along their hard axes of magnetization. The polarity and orientation of the output windings 23 will be discussed hereinafter. In addition, to be consistent with the winding polarities described above, the sources 41 and 42 will henceforth be assumed to supply current of the same polarity. The polarity of the readout source 43 is arbitrary and an alternating current source might well be used.

Figure 3:
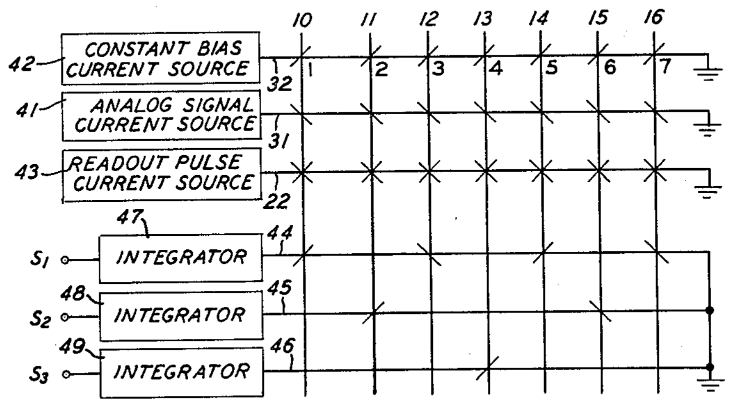
FIG. 3 is an equivalent electrical model for the circuit depicted in FIG. 1.

With the foregoing organization of this one embodiment of a thin film analog-to-digital encoder in mind, the operation thereof may best be described by referring to FIG. 3. Each vertical line contained therein represents one of the thin film elements 10–16, as labeled, and the horizontal lines represent the readout winding 22 and the bias winding, signal winding and three output circuits 32, 31, 44, 45 and 46, respectively. Each single slash mark at an intersection of the horizontal and vertical lines represents a winding of the circuit inductively coupled to the film element along its easy axis of magnetization, while all double slash marks (X) denote a winding of the circuit coupled to the film element along its hard axis of magnetization, each single slash mark in the first and third quadrant being of one polarity and each mark contained in the second and fourth quadrants being of the opposite polarity. Also, the numbers along the sides of the intersections with the bias circuit 32 indicate the relative number of turns of the bias winding 24 on the respective film elements. This is then another model for the circuit whose schematic diagram appears in FIG. 1.

It may be clearly seen that a constant biasing current $i_b$ supplied by the source 42 to the varying number of biasing turns contained in the biasing windings 24 on the elements 10–16 produces a flux along the easy axes of magnetization of the elements in the same polarity but of differing magnitudes.

To most easily facilitate an understanding of the functional operation of the present encoder, two different analog signal current magnitudes, and hence two different signal current to bias current ratios, will be investigated. Assume, for example, that the analog signal source 41 supplies a signal current $i_s$ such that $$2<\frac{i_s}{i_b}<3$$

this would indicate that the magnetic field produced by the signal current $i_s$ is greater than the magnetic bias field of the two least-biased film elements 10 and 11 and less than the bias field on each of the film elements 12–16.

At some later time the next regularly occurring readout current pulse $i_p$ generated by the readout pulse current source 43 appears. The flux produced by this current $i_p$ is of sufficient magnitude to tip the magnetization vector in all the thin film elements 10–16 from its former orientation along the easy axis to now lie along the hard axis of magnetization in the direction of the applied readout field. Upon removal of the readout current pulse $i_p$, the flux vector in each of the elements 10–16 again rotates, in this case from a direction along the hard axis to a new orientation along one of the two possible directions of the easy axis. The magnetic vector will choose an orientation along the signal field direction of the easy axis if the signal field is greater than the applied biasing field. Similarly, the vector will choose an orientation along the bias field direction of the easy axis if the bias field exceeds the signal field. This tipping, or rotating, mode of operation is unique to thin film elements, and has been discussed at great length in the literature. See, for example, "Theoretical Hysteresis Loops of Thin Magnetic Films" by H. J. Ogvey, Proceedings of the I.R.E., June 1960, or the aforementioned Electronics Magazine article.

Figure 2:
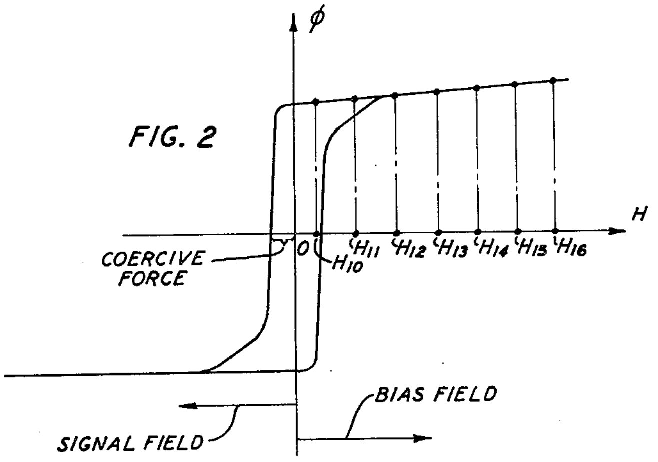
FIG. 2 is a typical hysteresis characteristic for the easy axis of magnetization of each of the thin film elements employed in FIG. 1, and has projected thereon various biasing drives for the element.

Thus, in the specific example assumed above, the film elements 10 and 11 rotate to the analog signal direction (signal field direction illustrated in FIG. 2) while the elements 12–16 rotate to the opposite direction governed by the biasing source (bias field direction illustrated in FIG. 2). Thus, in both cases the output windings 23 sense a net increase in flux along the easy axis of magnetization but these increases are of opposite polarities which depend upon the direction of the difference between the bias and signal fields. The flux changes produced in film elements 12–16 induce no voltages in their respective output windings because the shunt diodes 43 (FIG. 1) associated therewith are forward-biased, thereby preventing any voltages from appearing thereacross, while, on the other hand, a voltage is induced in the windings associated with film elements 10 and 11 as the diodes 43 on these elements are reverse biased.

Figure 4:
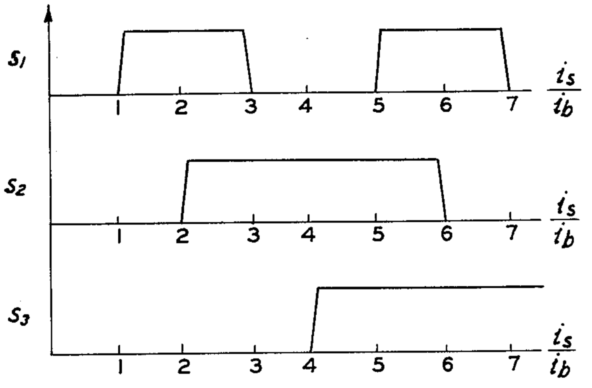
FIG. 4 illustrates the voltage levels generated at the output of FIG. 1 for various ratios of signal current to bias current.

Referring again to FIG. 3, note that the output windings of activated elements 10 and 11 are contained in output circuits 44 and 45, respectively. The voltages induced therein are fed to the integrators 47 and 48, generating substantially rectangular voltages of equal magnitude at the output terminals $S_1$ and $S_2$, respectively. The output voltage at terminal $S_3$, i.e., the output of the integrator 49, is, of course, zero. This set of output voltages is illustrated in FIG. 4 for the appropriate assumed signal current to bias current ratio, i.e., for $$2<\frac{i_s}{i_b}<3$$

It is to be noted that the coercive force of the hysteresis loop illustrated in FIG. 2 is not involved in the switching process. Each element, in determining to which of the two possible directions along the easy axis it will rotate upon the termination of the readout pulse, makes a zero-threshold decision based upon whether the applied signal or bias field is larger, as discussed above. The width of the hysteresis loop is not a factor. For this reason the least-biased film element 10 may have a magnetic biasing field whose magnitude is less than the coercive force.

Also note that between readout or sampling pulses the film elements 10–16 may or may not switch their flux orientations along their easy axes due to changing signal field conditions. Should the analog signal field change between sampling times to exceed the bias field in any one element by more than the coercive force, there will be a flux reversal unless the readout pulse period is less than the maximum switching speed of the film. Whether or not such reversals occur is of no concern in the operation of the encoder, as readouts are constrained to occur only at the time the readout current pulses are removed.

As a second example, assume the signal current $i_s$ is such that $$4<\frac{i_s}{i_b}<5$$

The flux produced by the signal current $i_s$ is now greater than the bias applied to the film elements 10–13 while less than the biasing field applied to the elements 14–16. The next regularly recurring readout pulse rotates the magnetic orientation vector of the thin film elements 10–16 from a direction along the easy magnetization axis to the hard magnetization axis. When the duration of the current pulse $i_p$ is over, the magnetic vectors in the thin film elements 10–13 rotate to the analog signal direction of the easy axis, thereby inducing signals in their respective output windings. The vectors associated with the thin film elements 14–16, however, rotate to the biasing field direction along the easy axis and the signals induced by this increase in flux are once again shunted out by the appropriate forward-biased diodes. Note that the output circuit 44 has both a positive signal from the element 10 and a negative signal from the element 12. These signals cancel, yielding no net signal in the output circuit 44 and therefore no voltage at the output of the integrator 47. Output circuits 45 and 46, however, both contain one activated output winding from the film elements 11 and 13, respectively, and thus both the integrators 48 and 49 generate outputs. This set of voltages is also illustrated in FIG. 4 for $$4<\frac{i_s}{i_b}<5$$

From this example it may be seen that whenever an even number of film elements are switched in an output circuit, the voltages induced therein are of opposite polarities and the time integral thereof then yields a zero value of resulting voltage. An odd number of induced signals, however, does generate a net output.

Thus, the analog signal $i_s$ supplied by analog signal source 41 is sampled at regularly recurring time intervals by the reset pulse source 43, and a binary representation of the magnitude of the signal $i_s$ automatically appears at the output terminals $S_1$, $S_2$ and $S_3$ in digital Gray-coded form. It is significant to note that no additional external logic need be performed on the voltages contained in the individual output windings 23.

The substitution of any other coding may be easily accomplished by altering the combinations employed to form the output circuits 44–46. In any other coding, however, the flux rotation of the individual elements must be sensed by a plurality of the output circuits. For a complete description of such arrangements for alternate codings, see my aforementioned copending application. Thus, the circuit, a model of which is depicted in FIG. 3, is capable, with suitable modifications in the output circuit combinations, of converting a unipolar analog signal to any desired binary encoding. Generalizing, it may be clearly seen that any alternating current analog signal may likewise be encoded by superimposing thereon a constant direct-current component greater than the maximum excursion of the alternating analog signal current so as to form a unipolar signal.

In addition, the diodes 43 across the output windings 23 may be removed and a single diode connected in series with each of the output circuits 44–46 to eliminate any negative signals being transmitted from the output circuits 44–46 to the integrators 47–49. If this is done, however, a limiter circuit must follow the integrators to prevent the cases in which two of the output signals are additive. A signal current to bias current ratio, $$1<\frac{i_s}{i_b}<2$$

wherein only the film element 10 is switched, illustrates this point. Output circuit 44 shown in FIG. 3, in the absence of an analog signal, contains signals of one polarity from film elements 12 and 16, and of an opposite polarity from elements 10 and 14. When element 10, however, switches states, the signal induced by this element in output circuit 44 upon readout adds to that produced by elements 12 and 16, thus leaving a net of two voltages sensed in this polarity, which doubles the voltage output of the integrator 47. Thus, a limiter circuit is necessary if uniform output voltages are desired.

Also, both the limiter circuits and the series diodes may be eliminated simply by doubling the number of turns of the output winding on the film element 13 and including a diode in series therewith to eliminate any negative signals. This embodiment has the additional advantage of yielding equal signals twice as large as the embodiment illustrated in FIG. 1. This alternate structure utilizes in effect the fact that the voltages from two consecutive elements in any of the output circuits are additive, as described above for output circuit 44 in the case wherein $$1<\frac{i_s}{i_b}<2$$

The number of turns of the winding on film element 13 must be doubled as the output circuit 46 contains only this one winding.

Figure 5:
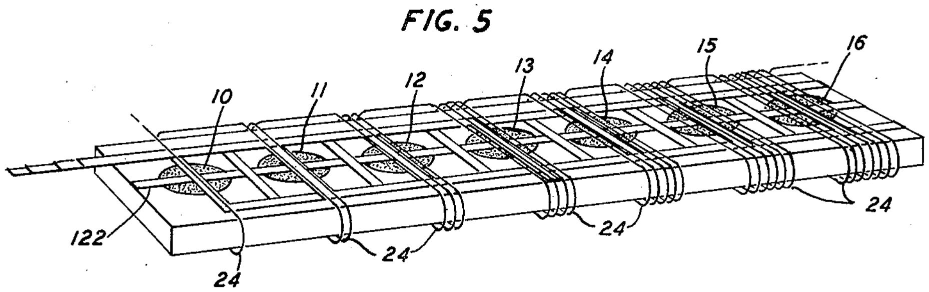
FIG. 5 illustrates part of a second specific thin film analog-to-digital encoder made in accordance with the principles of the present invention.
Figure 6:
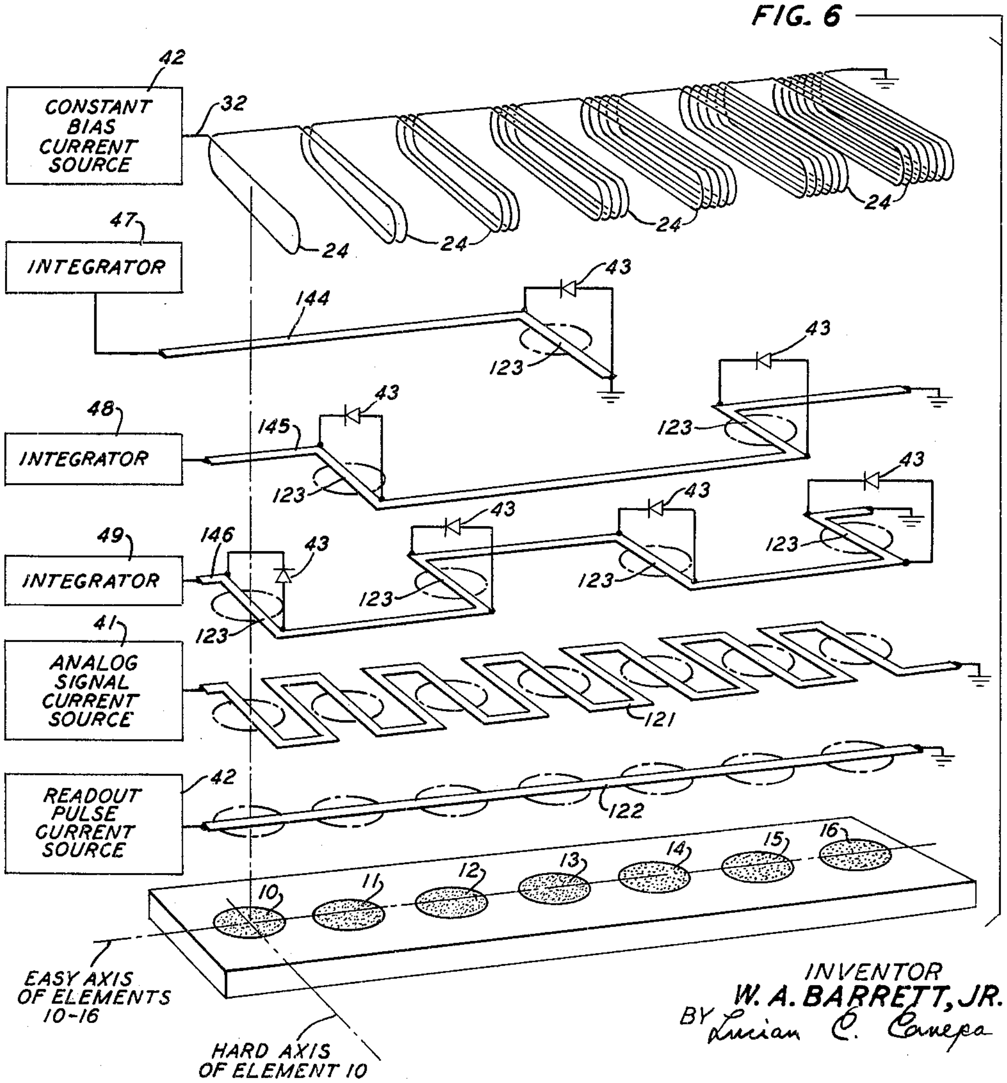
FIG. 6 is an exploded view of the complete encoder partially illustrated in FIG. 5.

A second illustrative embodiment of the present invention, which is partially illustrated in FIG. 5, is structurally distinct but functionally identical to the arrangement previously illustrated and described. A complete exploded view of this embodiment is shown in FIG. 6, which more clearly depicts the individual windings and circuits. The analog windings 21 have been replaced by a continuous conducting strip 121 whose portions that are closely adjacent to the thin film elements 10–16 are respectively parallel to the hard axes of magnetization of the elements. This conducting strip is grounded at one end and connected at the other end to signal source 41 and thus produces a flux along the easy axes of magnetization of the elements, as was previously done by the signal winding 21. A pulse readout conducting strip 122, parallel to the easy axis of magnetization of each of the thin film elements 10–16, is grounded at one end and connected at the other to readout pulse source 42. This conducting strip induces a flux in each of the thin film switching elements 10–16 along its hard axis of magnetization identically as was formerly accomplished by the readout pulse winding 22. Similarly, a plurality of sense conductors 123, parallel to the hard magnetization axes of the films 10–16, are selectively connected into the output circuits 144–146, as shown, the conductors being grounded at one side and respectively connected at the other to integrators 47–49. The appropriate diodes 43 are shunted along the sense conductors 123. The biasing windings 24, the biasing circuit 32 and the biasing source 42 are connected identically as was done in FIG. 1. As this embodiment is functionally identical to the one previously described, no detailed operation thereof will be presented. It should be noted, however, that this arrangement may be more simply constructed, as each of the conducting strips may be printed on a tape or circuit board which may be more simply mechanically interconnected.

To summarize the basic general concepts of the present invention, a plurality of thin film switching elements are coupled to different strength magnetic biasing fields along their easy axes of magnetization. The elements are further inductively coupled to each of an analog signal, readout pulses, and an output sensing device. The analog signal flux is of an opposite polarity as the applied bias, and the readout flux pulses are orthogonal to both the bias and signal fields and lie along the hard magnetization axes of the films. The output sensing devices detect net flux changes along the easy axis of magnetization and are serially connected into output circuits in alternating polarities.

Upon the occurrence of a readout signal, the magnetic vectors contained in the film elements rotate to an orientation along the hard axis of magnetization. Upon removal of the readout signals, those elements in which the signal field exceeds the bias field rotate to a new orientation along the easy axis determined by the analog source, while the others rotate to the opposite direction along the easy magnetization axis. The output sensing devices sense a signal of one polarity for rotations terminating on one direction on the easy axis and an opposite polarity from the other. The signals induced from elements whose rotations terminate in the bias direction are eliminated by the use of shunting diodes. Output circuits with an odd number of activated sense devices produce an output, while those with an even number do not. These signals may then be used, per se, as being representative of the instantaneous magnitude of the analog signal, or they may be further supplied to integrating networks, the outputs of which are essentially rectangular pulses.

By employing a plurality of output sensing devices on any one switching element, any desired encoding may result, while employing just one sensing device per switching element, as described herein, will result in a Gray-coded output.

It is to be understood that the above-described arrangements are only illustrative of the application of principles of the present invention. Numerous other arrangements may be devised by those skilled in the art without departing from the spirit and scope of the invention. For example, a differentiated symmetrical square wave could be employed for the readout current pulses. If, as is well known, the frequency of the square wave were greater than twice the highest frequency of the analog signal, the output of the integrators would contain a digital representation of all the information contained in the analog signal.

What is claimed is:

1. In combination in a magnetic analog-to-digital encoder, a plurality of thin film elements, means for selectively biasing each of said elements along its easy axis of magnetization to a different point on its hysteresis characteristic, means for applying equal analog current drives to each of said elements in a sense opposite to the bias condition thereon, means for simultaneously applying an equal readout pulse to each of said elements along its hard axis of magnetization, a plurality of output means each inductively coupled to the flux along the easy magnetization axis of one of said thin film elements, and a plurality of output circuits each comprising the series connection of one or more of said output means, said series connection being of a proper sense to accomplish any predetermined encoding.

2. A combination as in claim 1 wherein said means for selectively biasing each of said thin film elements along its easy axis of magnetization to a different point on its hysteresis characteristic comprises a source of constant biasing current and a bias winding inductively coupled to each of said thin film elements, said windings being of a differing number of turns and of a like polarity, said biasing windings being serially interconnected and further connected in series with said source of constant biasing current.

3. A combination as in claim 2 wherein said means for applying equal analog current drives comprises a source of analog signal current and an analog signal winding inductively coupled to each of said thin film elements, each of said windings being of a like number of turns and of a like polarity, said windings being serially interconnected and also further connected in series with said source of analog signal current.

4. A combination as in claim 3 wherein said means for simultaneously applying equal readout pulses comprises a source of readout current pulses and a readout pulse winding inductively coupled to each of said thin film elements, each of said windings being of a like number of turns, said windings being serially interconnected and also further connected in series with said source of readout pulses.

5. A combination as in claim 4 wherein said output means comprises an output winding coupled to each of said thin film elements.

6. A combination as in claim 5 further comprising a plurality of integrating networks and a plurality of diodes, both pluralities being in one to one correspondence with said plurality of output circuits, wherein one side of each of said output circuits is grounded and the other end serially connected to a different one of said plurality of integrating networks via one of said plurality of diodes.

7. A combination as in claim 4 wherein said output means comprises an output winding on each of said thin film elements and a diode in parallel with each of said output windings.

8. A combination as in claim 7 further comprising a plurality of integrating networks wherein one side of each of said output circuits is grounded and the other end connected to a different one of said integrating networks.

9. A combination as in claim 3 wherein said means for applying equal analog current drives comprises a source of analog signal current and a first continuous conducting strip parallel to the hard axis of magnetization of, and inductively coupled to, each of said plurality of thin film elements, said first conducting strip being serially connected to said source of analog signal current.

10. A combination as in claim 9 wherein said means for simultaneously applying equal readout pulses comprises a source of readout current pulses and a second continuous conducting strip parallel to the easy axis of magnetization of, and inductively coupled to, each of said plurality of thin film elements, said second conducting strip being serially connected to said source of readout current pulses.

11. A combination as in claim 10 wherein each of said output means comprises a segment of a continuous conducting strip parallel to the hard axis of magnetization of, and inductively coupled to, one of said plurality of thin film elements, and a diode connected in shunt with each of said segments, and where each of said output circuits comprises a series interconnection in alternating polarities of one or more of said segment and diode shunt arrangements.

12. A combination as in claim 11 further comprising a plurality of integrating networks wherein one side of each of said output circuits is grounded and the other end connected to a different one of said integrating networks.

13. In a thin film analog-to-digital encoder, a plurality of thin film elements, means for supplying a plurality of magnetic biasing fields of differing magnitudes and like polarities in one-to-one correspondence with said plurality of thin film elements, means for supplying a plurality of equal analog magnetic fields in one-to-one correspondence with said plurality of thin film elements, means for inductively coupling the net flux difference between one of said plurality of biasing fields and one of said analog magnetic fields to the easy axis of magnetization of each of said thin film elements, and means for simultaneously supplying an equal readout flux pulse to each of said thin elements along its hard axis of magnetization.

14. A combination as in claim 13 further comprising a plurality of output sensing means in one to one correspondence with said thin film elements and inductively coupled thereto along their easy axes of magnetization.

15. A combination as in claim 14 comprising a plurality of output circuits, each of said output circuits including the series connection of selected output sensing means.

References Cited by the Examiner

UNITED STATES PATENTS

| | | | |
|---|---|---|---|
| 3,045,230 | 7/62 | Tripp et al. | 340—347 |
| 3,050,713 | 8/62 | Harmon | 230—347.1 |
| 3,051,941 | 9/62 | Mallery | 340—347 |
| 3,081,452 | 3/63 | Meinken | 340—347 |
| 3,084,339 | 4/63 | Crittenden | 340—347 |

OTHER REFERENCES

Pages 92 to 94, 6/59, Brittmann, "Thin Films Memories," IRE Transactions on Electronic Computers, vol. EC8, No. 2, TK7885 A112.

MALCOLM A. MORRISON, *Primary Examiner.*